United States Patent [19]

Stewart

[11] 4,022,478
[45] May 10, 1977

[54] PUSH-BUTTON VIDEO DISC HUB
[75] Inventor: David S. Stewart, Palatine, Ill.
[73] Assignee: Zenith Radio Corporation, Glenview, Ill.
[22] Filed: July 3, 1975
[21] Appl. No.: 592,975
[52] U.S. Cl. .................... 274/10 S; 274/39 A; 346/137; 360/86; 360/99
[51] Int. Cl.² .................. G11B 5/82; G11B 17/00
[58] Field of Search .......... 274/10 S, 39; 346/137; 178/6.6 DD; 360/97, 98, 99, 86

[56] References Cited
UNITED STATES PATENTS

| | | | |
|---|---|---|---|
| 1,414,296 | 4/1922 | Menten | 346/137 |
| 2,336,933 | 12/1943 | Hicks | 346/137 |
| 3,241,840 | 3/1966 | Freier | 274/10 S |
| 3,838,460 | 9/1974 | Stewart | 274/39 A |

Primary Examiner—Richard E. Aegerter
Assistant Examiner—John W. Shepperd
Attorney, Agent, or Firm—Cornelius J. O'Connor

[57] ABSTRACT

A hub assembly for releasably securing an apertured record disc upon a base member includes a hollow elastic sleeve deformable from an upright quiescent position for receiving a disc to a compressed operative position. An actuator, engageable with the sleeve and displaceable from quiescent to operative positions, compresses the sleeve to secure the disc upon the base member. A latch, engageable with the actuator, retains the actuator in its operative position but is releasable by a spring to permit the compressed sleeve and actuator to their quiescent position and thus free the disc.

2 Claims, 5 Drawing Figures

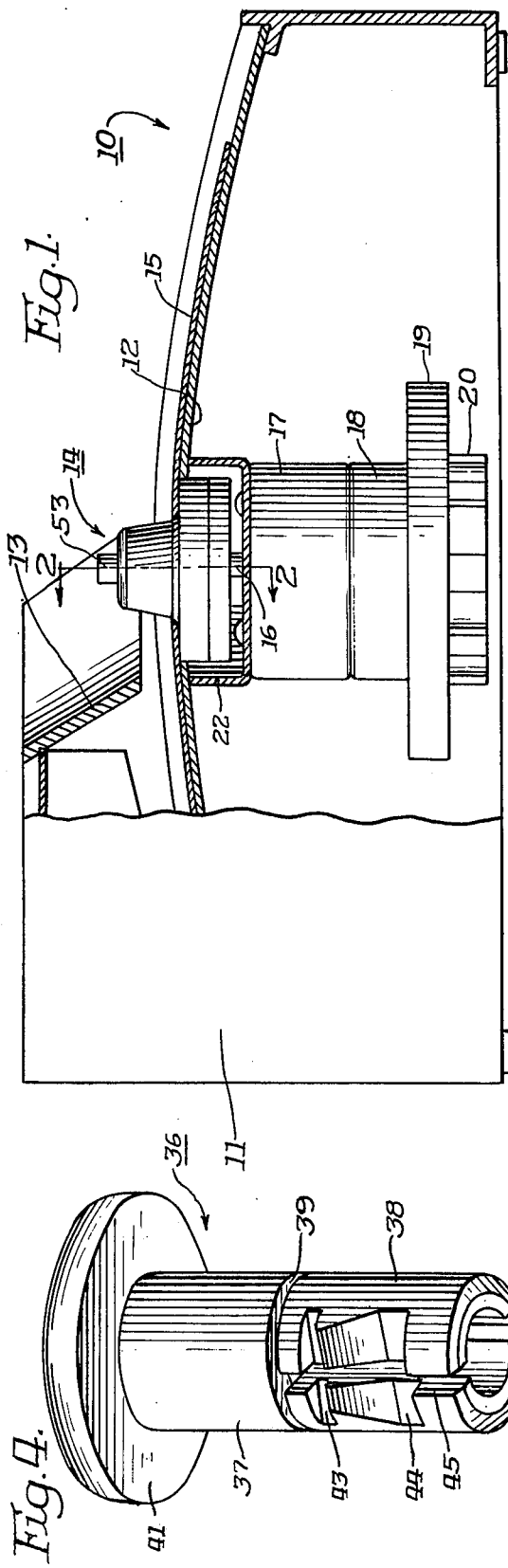
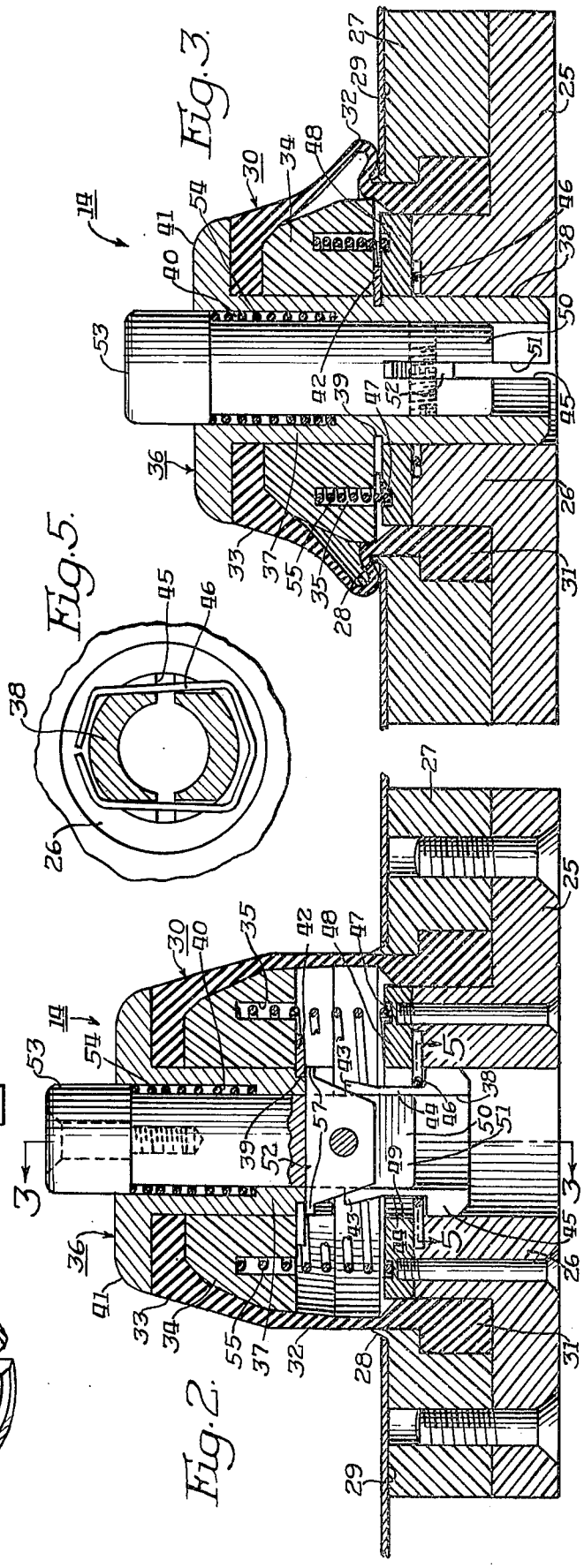

PUSH-BUTTON VIDEO DISC HUB

BACKGROUND OF THE INVENTION

This invention relates in general to video disc players and in particular to apparatus for releasably securing a video disc for high speed rotation in such a player.

The record disc familiar to most is the conventional audio record, generally a 0.050 inch thick vinyl disc which is indexed by a spindle and supported by a rotatably driven turntable for presentation to pick-up stylus. For all practical purposes there are but two types of audio discs on the market today, the 33 ⅓ RPM long-play record and the 45 RPM short-play record.

By way of contrast a video disc may be formed from 0.006 inch vinyl sheet, a construction which renders it extremely flexible and, to some extent, dictates the manner in which the disc is driven, or "flown," since it is partially supported for rotation upon a cushion of air. Video discs also formed from vinyl sheet but having a thickness up to 0.044 inch are also "flown" on a similar manner. A video disc is further distinguished from an audio record by virtue of the fact that the former must store an enormous quantity of information in comparison to that impressed upon the audio record. To accommodate such information the center-to-center spacing between adjacent tracks on a video disc is in the order of 7 microns. By way of comparison, the center-to-center spacing between the tracks in an audio record is approximately 100 microns. For reasons pertinent to the signal processing techniques employed in retrieving the information stored on a video disc, the disc is driven at a speed substantially in excess of that at which audio discs are rotated, for example, a video disc of the type herein described is driven or flown at 1,800 RPM. However, it is recognized that it is also possible to fly video discs at 900 or even 450 RPM, speeds that still point up a significant difference between video and audio record play. It is therefore, obvious that the apparatus and techniques employed in playing audio records are not readily adaptable to play-back of video discs.

A playback deck specifically designed for video discs is described in U.S. Pat. No. 3,803,351, which was filed Aug. 1, 1972 in the names of Charles R. Pedersen and David S. Stewart, which patent is assigned to the same asignee as the present invention. As shown in that applicaton, the video disc is indexed upon a hub and secured thereon by a removable magnetic type keeper, a component prone to misplacement. It is extremely important that the disc be firmly and releasably anchored to the hub since any variation in disc speed due to slippage between the disc and the hub will be manifested as incorrect information as the record track is monitored by the pick-up transducer. Accordingly, it is not only important that the disc be firmly secured to the hub but that provision be made for readily mounting and removing the disc. It is also important that the disc securing apparatus be arranged or so constructed as to preclude its loss or misplacement.

To resolve the misplacement problem, a built-in hub assembly was devised. Such a hub is described and claimed in U.S. Pat. No. 3,838,460 which issued to David S. Stewart on Sept. 24, 1974, which patent is also assigned to the assignee of the subject invention.

OBJECTS OF THE INVENTION

It is therefore a principal object of the invention to provide an improved hub assembly for releasably securing a video record disc for high speed rotation in a disc player.

It is also an object of the invention to provide a video disc indexing and supporting hub which can accommodate video discs of substantially different thicknesses.

It is a further object of this invention to provide a video disc hub assembly which provides uniform clamping of the disc around the entire periphery of its indexing aperture.

SUMMARY OF THE INVENTION

A hub assembly for releasably securing a centrally apertured record disc for high speed rotation in a video disc player comprises a disc supporting base member having an aperture and further having means comprising an upstanding rim surrounding the base member aperture and adapted to index the record disc. A hollow sleeve is provided which is formed of elastic material and is deformable from a quiescent upright position for admitting a record disc to the base member to a compressed operative position for securing the disc. This sleeve has a footing which is received within the aperture of the base member and is coupled thereto. The sleeve has a substantially cylindrical portion which is disposed contiguous to the footing and adjacent the indexing means of the base member. A conical portion of the sleeve, contiguous to the cylindrical portion, is tapered to a dimension less than the diameter of the cylindrical portion. This cylindrical portion has a wall thickness that is significantly thinner than the wall of the conical portion. A core member is disposed within the tapered portion of the sleeve for preserving the contour of that portion when the sleeve is compressed to its operative position. An actuator, extending through the sleeve and core member, is engageable with the tapered sleeve portion and is displaceable with the sleeve along the central axis of the sleeve from a quiescent position in which the sleeve is maintained in its upright position to an operating position in which it compresses the sleeve to first collapse the cylindrical sleeve portion in a direction normal to the axis of the sleeve and over the indexing rim and then to drive the collapsed portion against the upper inner peripheral surface of an indexed record positioned on the base member to effect a uniform clamping of the record against the base member. The actuator further has a section having a detent groove. A latch spring, embracing this actuator section, engages the detent groove when the actuator is displaced to the operating position. Means are included in the base member to retain the latch spring. An axially displaceable release means, centrally disposed within the actuator, comprises a tapered trip member for disengaging the latch spring from the actuator detent groove to permit the compressed sleeve and the actuator to return to their quiescent positions thereby freeing the record disc.

BRIEF DESCRIPTION OF THE DRAWINGS

The features of the invention which are believed to be novel are set forth with particularity in the appended claims. The invention, together with further objects and advantages thereof, may best be understood by reference to the following description taken in conjunction with the accompanying drawings in which:

FIG. 1 is an elevational view, partly broken away, and partly in section, illustrating a video disc playback machine employing a hub assembly constructed in accordance with the invention;

FIG. 2 is a sectional view of the hub assembly taken along lines 2—2 in FIG. 1;

FIG. 3 is a sectional view of the hub assembly, taken along lines 3—3 in FIG. 2;

FIG. 4 is a perspective view of the actuator portion of the hub assembly of FIG. 2; and FIG. 5 is a cross-sectional view taken along lines 5—5 in FIG. 2 illustrating the latching spring.

DESCRIPTION OF THE PREFERRED EMBODIMENT

The apparatus herein described finds a particular application in a disc playback machine of the type shown and described in the aforementioned Pedersen et al patent. Accordingly, and with reference to FIG. 1, such a playback machine 10 comprises a housing 11 having a curved centrally apertured deck 12 which is supported by the side walls of the housing. A cover 13, which overlies a portion of the deck, serves to protect a carriage assembly employed for supporting and tracking a transducer pickup device across the vinyl disc. A carriage suitable for this function is described and claimed in U.S. Pat. No. 3,852,816, which issued Dec. 3, 1974 to David S. Stewart, which patent is also assigned to the same assignee as the subject invention. Since the type of transducer carriage employed is not germane to the present invention it is not shown nor described.

In place of a turntable, apparatus in the form of a hub assembly 14 is utilized for releasably securing a centrally apertured vinyl disc 15 for rotation above deck 12. The hub assembly is secured atop the rotatable shaft 16 of a constant speed motor 17, preferably a hysteresis synchronous type unit, having an external armature 18 that supports a fly wheel 19 and a cooling fan 20. The motor is suspended from a bracket 22, which is affixed to the underside of deck 12. Mounted in this fashion hub assembly 14 extends through the central opening in the deck to receive vinyl disc 15.

In accordance with the subject invention, and as best seen in FIGS. 2-5, a hub assembly 14 for releasably securing a centrally apertured record disc for high speed rotation in a video disc player comprises a mounting block 25 having a centrally disposed pedestal 26. A disc supporting and indexing base member 27, in the shape of an annular ring is affixed to mounting block 25 so as to encircle pedestal 26. Base 27 comprises a circular upstanding rim or lip 28 which is formed atop the inner periphery of base 27. The upper reach of rim 28 has a diameter slightly less than the diameter of the aperture in a video disc to facilitate its serving as a means for indexing the record disc upon the shelf 29, or record supporting area, of base 27. Additionally, as shown in FIG. 2, the outwardly facing wall of rim 28 slopes down to effect a centering of the disc.

The hub assembly further comprises a hollow boot or sleeve 30 which is formed of an elastic material so that when it is deformed from its normal upright position, shown in FIG. 2, to be compressed operative position, FIG. 3, its inherent elasticity serves to return the sleeve to its normal position. In its upright position, sleeve 30 is configured to admit a record disc to support shelf 29 of base 27. This sleeve comprises a thickened circular footing 31 which encircles pedestal 26 and is captured between mounting block 25 and base 27. Extending upwardly from the footing 31 of the sleeve is a substantially cylindrical thin wall portion 32 that is located adjacent the indexing rim 28 of base 27. Continuing upward, the immediately contiguous portion 33 of the sleeve tapers, in a conical fashion, to a dimension which is significantly less than the diameter of a disc aperture to permit ready admittance and removal of a record disc.

As seen in FIGS. 2 and 3, the wall thickness of sleeve 30 varies from the thick footing 31 to the severely reduced wall of cylindrical portion 32 and then to a gradually thickening wall for cone 33. This construction is intentional to insure that the cylindrical portion 32 will readily collapse over indexing rim 28 when the sleeve is compressed in a manner to be described. On the other hand, the wall of cone 33 is thickened to insure that it does not ripple or fold when the sleeve is collapsed. However, to insure that the contour of the cone portion of the sleeve is preserved, a form fitting core member 34 is enclosed within conical portion 33. For a purpose subsequently detailed, a circular channel 35 is cut in the under surface of core 34.

The hub assembly further includes an actuator 36 which is engageable with the conical portion 33 of the sleeve and is displaceable from its quiescent position, FIG. 2, in which sleeve 30 is maintained in its upright position to an operating position, FIG. 3, in which the actuator compresses the sleeve to collapse the cylindrical portion 32 against the upper inner peripheral surface of an indexed record disc positioned upon shelf 29 of the base to secure the record thereon.

More particularly, acutator 36 comprises a centrally apertured body having upper and lower cylindrical sections 37, 38 separated by an annular groove 39, see FIG. 4. Actuator section 37, which includes a well 40, is surmounted by a cap 41. A retaining ring 42, which is seated in groove 39, serves to captivate the conical portion of sleeve 30 between core 34 and cap 41 of the actuator.

The lower section 38 of the actuator comprises a pair of oppositely disposed detent slots 43 as well as a pair of oppositely disposed flats 44 (only one flat shown in FIG. 4), the upper extremities of which taper outwardly until they encounter slots 43, all for a purpose soon to be explained. Actuator section 38 further includes an axially relieved recess 45 which extends upwardly through section 38 to a point immediately below groove 39.

A latch means, engageable with the actuator for retaining it in its operating position comprises a hairpin-shaped spring 46 which embraces section 38 about flats 44, see FIG. 5. As can now be appreciated, the purpose of flats 44 is to prevent latching spring 46 from rotating about actuator section 38. Spring 46 is restrained from vertical displacement by a flat collar 48 comprising a spring receiving annular groove 47 and having a central aperture 49 having a diameter sufficient to freely pass the lower section 38 of the actuator. Spring 46 is restrained by virtue of the fact that its bight sections extend beyond the inside diameters of pedestal 26 and overlying collar 48.

Finally, the hub assembly comprises release means for disengaging latch spring 46 to permit the compressed sleeve and actuator to return to their quiescent positions and thereby free an indexed record. This release means comprises the plunger 50 having an axially relieved portion 51, having the same width dimension as actuator recess 45, for receiving a trip plate 52 having a pair of oppositely disposed ears 57. Plate 52 is free to travel vertically in recess 45 of actuator section 38 but is fixedly secured to plunger 50 by a fastener to the end that trip plate 52 is directly actuated by the plunger. The plunger is topped by a button 53 which serves to captivate a plunger return spring 54 between its under surface and the bottom of well 40 in actuator section 37.

As initially contemplated, it was intended that the inherent elasticity of sleeve 30 would be relied upon to return the sleeve to its upright position when the latch release means was actuated. However, the unpredictabilities of elastic materials are such that, rather than rely on the elasticity of the sleeve material alone to return it and the actuator to their upright positions, it is preferred that a spring be included for insurance. Accordingly, a compression sring 55 is captivated between sleeve core member 34 and the surface of collar 48, with its upper turns received within circular channel 35 in the under side of core 34 and with its lower turns seated in groove 47 in collar 48.

In operation a record disc is mounted upon the hub assembly by threading its indexing aperture over the conical portion of sleeve 30 to permit the disc to rest upon shelf 29 of base member 27. Proper indexing of the record is assured by the circumferential indexing rim 28 extending upwardly from shelf 29. Now in order to secure the disc for rotation upon the hub, manual, or other, pressure is exerted upon actuator cap 41 to displace the actuator and sleeve downwardly from their elevated positions shown in FIG. 2 to the operative position of FIG. 3. The sequence of events during this actuation is as follows. Applying pressure upon actuator cap 41 drives the actuator, sleeve core 34 and the release plunger 50 and its trip plate 52 downward. This action compresses sleeve 30 causing its cylindrical section 32 to collapse over indexing rim 28 and engage the upper inner peripheral surface of the indexed record. The record disc is now firmly secured to upon shelf 29 with a uniform clamping pressure exerted around the entire inner periphery of the record.

Continuing, when actuator section 38 is fully depressed, the flats 44 and their tapering upper extremities have been driven below latching spring 46 permitting spring 46 to snap into the detent slots 43. By way of a safety precaution, it should be noted that ears 57 on trip plate 52 will prevent latch spring 46 from being driven beyond detent slots 43. The cooperation between the latching spring and the detent slots serves to retain the actuator in the operative position shown in FIG. 3. In this view note that the collapsed side wall section 32 of the sleeve lies over indexing rim 28 to urge the entire inner peripheral surface of the indexed record against support shelf 29. As shown in FIG. 3, a record having a thickness less than the elevation of indexing rim 28 is disclosed to emphasize the versatility of the subject hub assembly. A record as thin as 0.004 to 0.006 inches is readily secured upon support shelf 29. Moreover, substantially thicker records, even up to 0.045 inches, are readily accommodated by the subject hub assembly since the collapsing action of the sleeve will securely retain a record of even that thickness.

In order to remove a record disc, the release plunger 50 is depressed to drive trip plate 52 downward in guide slot 45 in actuator section 38. As plate 52 descends its tapered sides engage latch spring 46 and drive it outwardly until it is free of detent slots 43. At that instant the action of spring 54 returns plunger 50 to its quiescent position while the action of compression spring 55 drives the actuator 36, core 34 and sleeve 30 upwards to their quiescent positions. The record disc is now readily removable from support shelf 29.

In summary there has been shown and described an improved video disc hub assembly which serves to rapidly and positively secure a record disc upon the support surface of a playback machine. The hub assembly is characterized by a positive actuating mechanism that affords uniform holding pressure around the entire inner periphery of the record. Moreover, the disclosed hub assembly is capable of accommodating a variety of record discs whose thicknesses vary over a wide range.

While particular embodiments of the invention have been shown and described, it will be obvious to those skilled in the art that changes and modifications may be made thereto without departing from the invention in its broader aspects and, therefore, the aim in the appended claims is to cover all such changes and modifications as fall within the true spirit and scope of the invention.

What is claimed is:

1. A hub assembly for releasably securing a centrally apertured record disc for rotation in a disc player, said apparatus comprising:
   a disc supporting base member havng an aperture and further having means comprising an upstanding rim surrounding said base member aperture adapted to index a record disc;
   a hollow sleeve formed of elastic material and deformable from a quiescent upright position for admitting a record disc to said base member to a compressed operative position for securing such a disc;
   said sleeve having a footing received within said aperture and coupled to said base member, a substantially cylindrical portion contiguous to said footing and disposed adjacent said indexing means of said base member,
   a conical portion contiguous to said cylindrical portion and tapered to a dimension less than the diameter of said cylindrical porton, said cylindrical portion of said sleeve having a wall thickness significantly thinner than the wall of said conical portion;
   a core member disposed within said tapered sleeve portion for preserving the contour of said tapered portion when said sleeve is compressed to its operative position;
   an actuator, extending through said sleeve and said core member, engageable with said tapered sleeve portion and displaceable with said sleeve along the central axis of said sleeve from a quiescent position in which said sleeve is maintained in an upright position to an operating position in which said actuator compresses said sleeve to first collapse said cylindrical sleeve portion in a direction normal to said central axis and over said indexing rim and then drive said collapsed portion against the upper inner peripheral surface of an indexed record disc positioned upon said base member to effect a uniform clamping of the record against said base member,
   said actuator further having a section having a detent groove;

a latch spring embracing said actuator section and engageable with said actuator detent groove, when said actuator is displaced to said operating position, for retaining said actuator in its operative position; means in said base member for retaining said latch spring; and axially displaceable release means centrally disposed within said actuator and comprising a tapered trip member for disengaging said latch spring from said actuator detent groove to permit said compressed sleeve and said actuator to return to their quiescent positions thereby freeing said record disc.

2. A hub assembly as set forth in claim 1 which further includes compression spring means captivated between said core member and said base member for returning said actuator and said sleeve to their quiescent positions when said release means disenagages said latch means.

* * * * *